United States Patent [19]

McCanny et al.

[11] Patent Number: 4,885,715

[45] Date of Patent: Dec. 5, 1989

[54] DIGITAL PROCESSOR FOR CONVOLUTION AND CORRELATION

[75] Inventors: John V. McCanny, County Down, Ireland; Richard A. Evans, Herefordshire; John G. McWhirter, Worcestershire, both of Great Britain

[73] Assignee: The Secretary of State for Defence in Her Britannic Majesty's Government of the United Kingdom of Great Britain and Northern Ireland, London, England

[21] Appl. No.: 21,939

[22] Filed: Mar. 5, 1987

[30] Foreign Application Priority Data

Mar. 5, 1986 [GB] United Kingdom ............... 8605366

[51] Int. Cl.$^4$ ............................................ G06F 15/336
[52] U.S. Cl. ......................... 364/728.01; 364/728.03
[58] Field of Search ............... 364/728, 736, 200, 754, 364/728.01, 728.03

[56] References Cited

U.S. PATENT DOCUMENTS

| | | | |
|---|---|---|---|
| 4,489,393 | 12/1984 | Kawahara et al. | 364/728 |
| 4,533,993 | 8/1985 | McCanny et al. | 364/200 |
| 4,639,857 | 1/1987 | McCanny et al. | 364/754 |
| 4,686,645 | 8/1987 | McCanny et al. | 364/754 |
| 4,701,876 | 10/1987 | McCanny et al. | 364/754 |

OTHER PUBLICATIONS

"Efficient Bit-Level Systolic Arrays For Inner Product Computation," R. B. Urquhart and D. Wood, 645 G.E.C. Journal of Research No. 1, (1984), pp.52-55.

Primary Examiner—Gary V. Harkcom
Assistant Examiner—Long T. Nguyen
Attorney, Agent, or Firm—Nixon & Vanderhye

[57] ABSTRACT

A digital processor performs an N-point convolution or correlation of q-bit coefficients with data words guard band extended to p bits. The processor includes an array of one-bit clock-activated gated full adder cells arranged in N rows and q columns. Each cell is arranged to input data, carry and cumulative sum bits and to output the data bit and new carry and cumulative sum bits corresponding to the product of the input data bit with a respective stationary coefficient bit. The output carry bit is recirculated on the respective cell. Cumulative sum generation is cascaded down array columns. Data moves along each row and thence to the next lower row via a delay device providing a delay appropriate for correct partial product formation. Data is input bit and word serially to a first row cell and thereafter moves along successive rows progressively further down the array. Sums of partial products output by the array are accumulated according to bit significance by an accumulator device arranged to accumulate successive convolution or correlation results in different adding device. This avoids erroneous addition of contributions to different results. The array is cascadable to provide larger processors. Cascaded arrays may be arranged to be fault tolerant, and a faulty array may be bypassed without operating speed penalties arising from bypass lines.

8 Claims, 5 Drawing Sheets

DIGITAL PROCESSOR FOR CONVOLUTION AND CORRELATION

CROSS-REFERENCE TO RELATED APPLICATIONS

This application is related to related U.S. application Ser. No. 07/022,309, filed Mar. 1, 1987.

FIELD OF THE INVENTION

This invention relates to a digital processor for performing the mathematically equivalent convolution and correlation operations, the processor being of the kind implemented as a bit-level systolic array.

BACKGROUND AND SUMMARY OF THE INVENTION

Known digital processors for convolution and correlation implemented as bit-level systolic arrays are described in British Patent Application No. 2106287A published on Apr. 7, 1983 (Reference 1), which corresponds to U.S. Pat. No. 4,533,393, and U.S. Pat. No. 4,639,857, in which FIGS. 15 to 20 refere to a convolver. This device consists of a rectangular array of gated full adder logic cells arranged in rows and columns. Each cell is connected to its immediate row and column neighbours only, ie each cell is connected to a maximum of four other cells. Cell operation is controlled by clocked latches which effect movement of data, coefficient, carry and sum bits through the array. Each cell evaluates the product of an input data bit and an input coefficient bit received from left and right hand neighbors respectively, and adds the product to input carry and cumulative sum bits received from the right and above respectively. New carry and cumulative sum bits are generated for output to the left and below, and the input data and coefficient bits pass to the right and left respectively. Each coefficient word is circulated bit serially through a respective array row. Each data word passes through each row in succession and in effect spirals (strictly speaking zig-zags) up the array. Successive carries move with coefficient bits, and successive cumulative sums move down array columns. Data moves in counterflow with respect to both cumulative sum generation and coefficient and carry propagation. Cumulative sum generation is cascaded down array columns to produce partial sums output from the array. Partial sums of like bit significance emerge from the same array column in succession, and are accumulated to form convolution results by full adders arranged for output sum feedback.

It is a disadvantage to the use of processors described in Reference 1 that data and coefficient words must be interspersed with zero bits to avoid generation of unwanted partial products. At any time, at least half and in one case three quarters of the array cells compute zero partial products. The array is therefore inefficient, and much larger than would be required if interspersed zero bits could be avoided.

A further bit-level systolic array is described in British Patent Application No. 2144245A published Feb. 27, 1985 (Reference 2), which corresponds to U.S. Pat. No. 4,686,645. This relates to an array similar to that of Reference 1 for multiplying two matrices having multi-bit coefficients. This provides for row elements of one matrix to propagate along array rows in counter-flow with column elements of the other, carry bits being recirculated on each cell rather than moving along rows. The use of so-called "guard bands" is described, this being the extension of coefficient words with zero bits to provide for word growth of accumulating results.

British Patent Application No. 2147721A published May 15, 1985 (Reference 3), which corresponds to U.S. Pat. No. 4,701,876 relates to a further bit-level systolic array for matrix-vector multiplication. Improved array efficiency is obtained in two ways. Firstly, array output accumulation is arranged such that parts of the array corresponding to inactive regions in Reference 1 contribute to convolution results. Secondly, the need for zeros between data and coefficient bits is avoided by complex clocking arrangements effecting bit movement in adjacent rows on alternate clock cycles. As in References 1 and 2, multiplicand bits move in counterflow in array rows. As in Reference 2, carry bits are recirculated on each cell and word extension with guard bands is employed.

In the GEC Journal of Research, Vol. 2, No. 1, 1984, R. B. Urquhart and D. Wood introduce the concept of using static coefficients in bit-level systolic arrays. Each cell of an array is associated with a respective single bit of a coefficient, and a coefficient word is associated with a corresponding array row. The cells are arranged for carry bit recirculation, data is input to each array row and moves along it. Cumulative sum generation is cascaded down array columns and guard bands provide for word growth. Partial sums of like bit significance emerge from different array columns either with relative delays or synchronously according to whether input data meets coefficient bits in ascending or reverse order of bit significance. This arrangement provides 100% cell utilisation or array efficiency without requiring complex clocking arrangements.

Each cell computes products on every clock cycle, and all latches are clocked in the same way. Unfortunately, however, array accumulation as described cannot provide correct convolution or correlation results, since the scheme proposed would produce wrongful accumulation of partial sums and carry bits corresponding to different results.

In the art of digital arithmetic circuits, it is important to provide for standardisation of components if at all possible. This is greatly facilitated if integrated circuits designed for small calculations can be linked together or cascaded in an array to perform a much larger calculation. It is also important, although very rarely achievable, to provide for some degree of fault tolerance in such an array of integrated circuits, in order that a comparatively small fault might not render the array entirely useless. This is of particular importance in the developing field of wafer scale integration, in which wafer yields can be virtually zero without some degree of fault tolerance.

It is an object of the present invention to provide a digital processor for convolution or correlation capable of being cascaded to form a fault tolerant assembly.

The present invention provides a digital processor suitable for performing an N point convolution or correlation of coefficient words of q bits with data words guard band extended to p bits, and wherein:

(1) the processor includes an array of N rows and q columns of one-bit logic cells;

(2) each logic cell is arranged to:

(a) input data, carry and cumulative sum bits, (b) output the data bit, (c) produce output cumulative sum and carry bits corresponding to addition of the input cumulative sum and carry bits to the product of the input data bit with a respective stationary coefficient bit, and (d) recirculate the output carry bit on the respective cell to provide an input carry bit to a succeeding computation;

(3) cell interconnection lines are arranged to provide for propagation of data bits along array rows and for cascading cumulative sum generation down array columns;

(4) the cell interconnection lines include clock-activated first delaying means arranged to effect data bit movement along array rows at the same rate as cumulative sum bit movement down array columns;

(5) the array has a first row, first column cell for data input to the array word and bit serially, least significant bit leading;

(6) last column cells in the first to (N−1)th rows each have a data bit output connected via respective second delaying means to a data bit input of a first column cell in a respective adjacent or second to Nth row to provide for data to move along successive rows down the array, the first and second delaying means being arranged to delay successive data bits as appropriate for cascading cumulative sum generation down each array column; and (7) the processor includes accumulating means arranged to add cumulative sums of like bit significance output from different array columns and comprising contributions to like convolution or correlation terms.

The processor of the invention has the advantage of being cascadable to form a device suitable for performing a larger convolution or correlation calculation. Cascading may be achieved simply by connecting last row data and cumulative sum outputs of one array to corresponding first row inputs of another. In this case, guard bands require additional extension to accommodate formation of larger partial sums. Furthermore, a cascaded assembly of processors of the invention exhibits a degree of fault tolerance. If one processor in the assembly is faulty, it can be bridged out by connecting data and cumulative sum outputs from one neighbouring processor to corresponding inputs of the other via clock-activated latches. This permits fault tolerant designs in which a cascaded assembly includes additional or redundant processors brought into play in the event that the array includes faulty devices. The bridging latches avoid the penalty of reduction in operating speed arising from long bypass lines. Such latches cannot be employed in prior art processors in which data and results propagate in counterflow, since they would disrupt calculation timing.

The logic cell array produces partial sums each arising from a number of bit-level partial products. These partial sums are accumulated in accordance with bit significance by the accumulating means, which is preferably arranged to sum contributions to successive convolution or correlation results in separate adding means. This avoids errors due to addition of terms attributable to different results. In the case of a processor arranged for input data to meet coefficient bits in descending order of significance, the accumulating means comprises a plurality of adder chains each with a two clock cycle delay between adjacent adders. For input data meeting coefficient bits in ascending order of bit significance, a plurality of adder trees is employed. Switching between adder trees or chains may be effected by the use of means responsive to a least significant bit flag to indicate emergence of partial sums attributable to a new convolution or correlation result from the array. The switching means may include a D-type flip-flop arranged for clocking by successive least significant bit flags. Each flag changes two flip-flop output states to effect switching.

When arranged to compute an N-point convolution or correlation, each data bit delaying means provides a delay of $(1+\log_2 N + p - q)$ clock cycles, where non-integer values of $\log_2 N$ are rounded up to a whole number.

In a preferred embodiment, a processor of the invention includes a switchable accumulator with each adder chain connected to a first input of a respective full adder arranged for carry recirculation. Each full adder has a second input connected via delaying means to a respective convolution sum input, and also has an output connected to a convolution or correlation sum output of the processor. In this embodiment the processor may be cascaded as part of a chain of like processors connected output to neighbouring input. Each processor is then suitable for accumulating a respective part of a convolution or correlation result. Successive parts are appropriately delayed and added together in the aforesaid full adders. Cascading accordingly only requires passage of results, data and least significant bit flags via delays to successive processors. This avoids the need for inter-column connection between adjacent processors. To provide for fault tolerance without operating speed penalties, the processor may include latched bypass lines for results, data and lsb flags, the bypass lines being implemented in the event of the processor being faulty.

BRIEF DESCRIPTION OF THE DRAWINGS

In order that the invention might be more fully understood, embodiments thereof will now be described, with reference to the accompanying drawings, in which.

DETAILED DESCRIPTION

Figure 1:
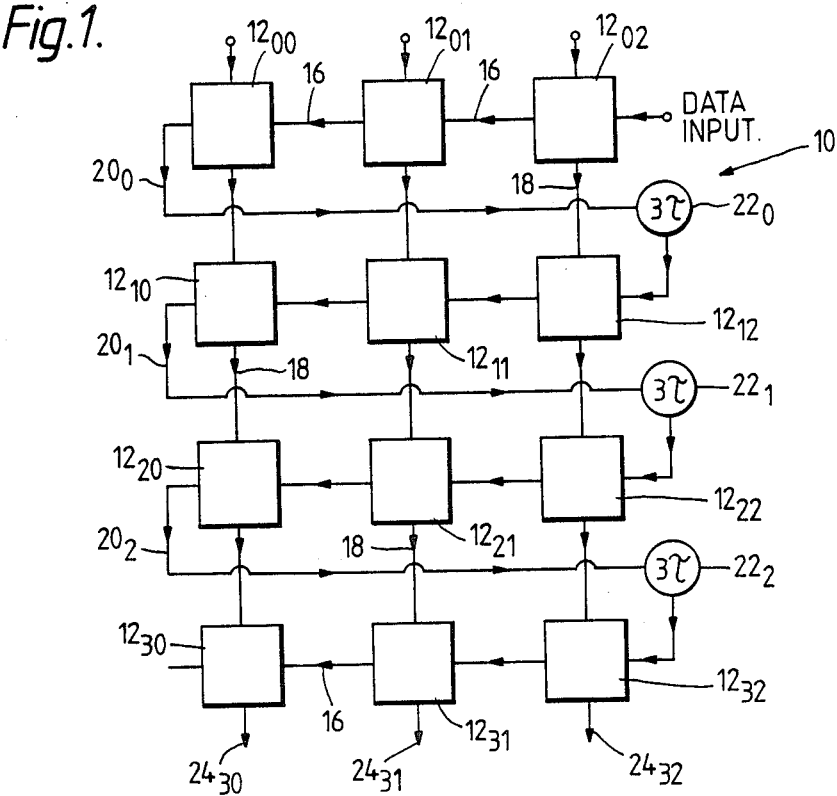
FIG. 1 is a block diagram of a logic cell array for a processor of the invention.
Figure 2:
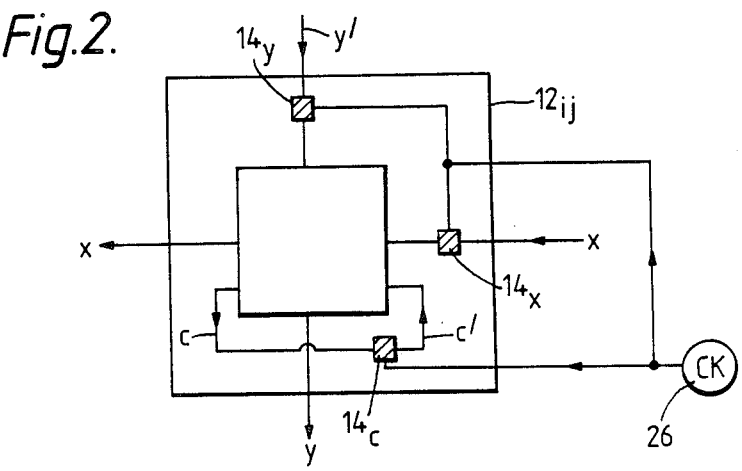
FIG. 2 shows a logic cell of the invention used in the FIG. 1 array.

Referring to FIGS. 1 and 2, there is shown an array 10 of logic cells 12 for a digital processor of the invention. This will be described in terms of the performance of the convolution operation, although it is also suitable for carrying out the mathematically equivalent correlation operation, as will be clarified later. Omitting indices for convenience, each cell 12 has indices i, j (i=0 to 3, j=0 to 2) indicating respectively row and column position, and is associated with a respective stationary one-bit multiplicative coefficient $a_j$. The array 10 is arranged to carry out the convolution of a bit-serial stream of positive data words with positive coefficients. The cell logic function is that of a gated full adder given by:

$$y \leftarrow y' \oplus (a.x) \oplus c' \quad (1.1)$$

$$c \leftarrow y'.c' + y'(a.x) + c'(a.x) \quad (1.2)$$

where:
x is an input data bit,
y' is an input cumulative sum bit,
y is an output cumulative sum bit,
a is a coefficient bit (ie $a_i^j$) stored in the cell,
c' is a carry bit from an earlier computation, and
c is an output carry bit.

Each cell 12 has three clock-activated input latches $14_x$, $14_y$ and $14_c$ which receive respectively data, cumulative sum and carry input bits. Data bits x input initially to first row cell $12_{02}$ pass along rows of the array 10 as indicated by arrows such as 16, ie from cell $12_{ij}$ to cell $12_{i(j-1)}$. Each newly computed cumulative sum output bit y passes down a respective array column to become the y' input to the next cell below, ie the y output of cell $12_{ij}$ becomes the y' input of cell $12_{(i+1)j}$. This is indicated by arrows such as 18. In this way cumulative sum generation is cascaded down columns of the array 10. The y' input latches $14_y$ of top row cells $12_{00}$ to $12_{02}$ receive zero input bits. Each carry input latch $14_c$ is connected to receive the output carry bit computed by the respective cell 12 one clock cycle earlier. This provides for carry bit recirculation, each cell 12 being arranged in the array 10 to compute successive products increasing in bit significance on successive cycles of operation.

Data bits x passing out of the $i^{th}$ row (i=0 to 2) of cells 12 are fed via a line $20_i$ to a respective delay unit indicated by a circle $22_i$. Each delay unit $22_i$ consists of three clock activated latches in series (not shown), and introduces a bit delay of three clock cycles, or $3\tau$ where $\tau$ is the clock period. Data leaving each delay unit $22_i$ passes as input to the (i+1)th row. The x data bits accordingly traverse a zig-zag or spiral path along successive rows and feedback lines of the array 10, entering the array at cell $12_{02}$ and finally reaching cell $12_{30}$. The results of cascading cumulative sum generation down array columns emerge from last row cell outputs $24_{30}$ to $24_{32}$.

Each of the latches $14_x$, $14_y$, $14_c$ and those incorporated in delay units $22_0$ to $22_2$ receive substantially synchronous clock signals on every cycle of array operation from clocking means indicated by 26. For the purposes of this specification, the expression "substantially synchronous" shall be construed as embracing minor degrees of nonsimultaneity shorter than a clock cycle, and arising from for example small differences in signal transit times from a clock to different latches. These do not affect array operation, as is well known in the art. Each latch comprises first and second half latches in series controlled by a two-phase non-overlapping clock signal from the clocking means 26. On a first phase clock pulse, each first half latch accepts an input bit and each second half latch outputs a stored bit. On a second phase pulse, each bit is clocked from the respective first half latch to the second ready for the next cycle of operation. The effect of this is that each cell 12 operates on every clock cycle. Whereas the cells 12 have full latches $14_x$ and $14_y$ on respective cell inputs, these could be located on cell outputs or divided into respective input and output half latches without affecting array operation. It is also known to employ a respective half latch instead of each full latch, which provides an alternative to the present embodiment. Such latches and clocking arrangements are well known in the art, in for example Reference 1, and will not be described further.

The array 10 operates as follows. Successive data words $X_0, X_1 \ldots X_n \ldots$ are input bit serially, least significant bit (lsb) leading to cell $12_{02}$. Each word $X_n$ has bits $x_n^k$ (k=0 to 2) and is extended with zero bits to accommodate result word growth as will be described. As the data words spiral down the array 10, partial products of the kind $a_i^j x_n^k$ are generated, ie when cell $12_{ij}$ receives input of $x_n^k$. Each column of the array 10 outputs on successive clock cycles successive cumulative partial sums of the partial products computed by cells of that column on the preceding four clock cycles. The partial sums are contribution to individual bits of convolution result words, and are accumulated by means to be described later.

Figure 3:
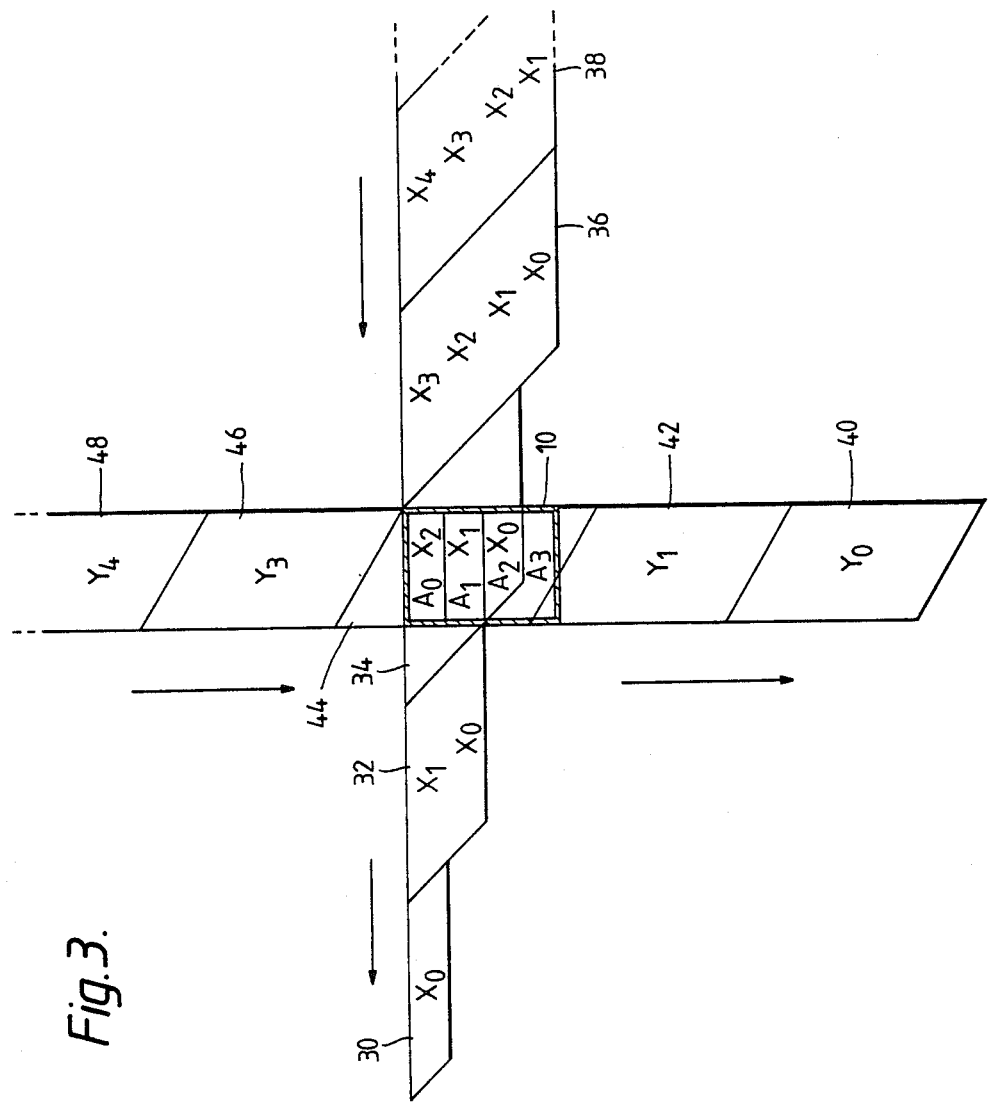
FIG. 3 illustrates word level data propagation and partial sum formation in the FIG. 1 array.

Referring now to FIG. 3, operation of the array (shown as a rectangle 10) is illustrated graphically at the word level. As will be described later, the spiral movement of data through the array 10 is equivalent to the situation illustrated. In the art of bit-level systolic arrays, the mode of operation of an array is conventionally analysed in terms of data and result parallelograms. These do not have physical significance, but constitute a graphical aid to understanding array operation. In FIG. 3, data word parallelograms 30 to 38 are shown moving to the left through the array 10 and result parallelograms 40 to 48 are shown moving down. Data parallelograms 30 and 32 have passed through the array 10, as have the corresponding convolution result parallelograms 40 and 42. This indicates that computation of relevant convolution partial sums by the array 10 has ended. Data and result parallelograms 34 and 44 overlie the array 10, which indicates convolution partial sums being computed. Data and result parallelograms 36, 38, 46 and 48 have yet to enter the array, and correspond to convolution partial sums yet to be computed.

To carry out an N-point convolution of N coefficient words $A_i$ with successive data words $X_{n-i}$ (n=0, 1, 2 . . .), it is necessary to evaluate:

$$Y_n = \sum_{i=0}^{N-1} A_i X_{n-i} \text{ provided } i \leq n \quad (1)$$

where $A_i$ has bits $a_i^j$, $X_{n-i}$ has bits $x_{n-i}^k$ and $Y_n$ represents the $n^{th}$ convolution result word having bits $y_n$. From Equation (1):

$Y_0 = A_0X_0, \quad Y_1 = A_0X_1 + A_1X_0,$
$Y_2 = A_0X_2 + A_1X_1 + A_2X_0,$ $Y_3 = A_0X_3 + A_1X_2 + A_2X_1 + A_3X_0,$
$Y_4 = A_0X_4 + A_1X_3 + A_2X_2 + A_3X_1,$ etc.

Comparison of the above expressions with FIG. 3 illustrates the significance of the parallelograms 30 to 48. Parallelogram 30 for example contains only $X_0$, which has passed through only the top row of the array 10 to generate $Y_0$, inputs to other rows having been zero (not shown). However, data parallelogram 36 contains $X_3$ to $X_0$ for input to all rows and multiplication by $A_0$ to $A_3$ to generate $Y_3$.

Figure 4:
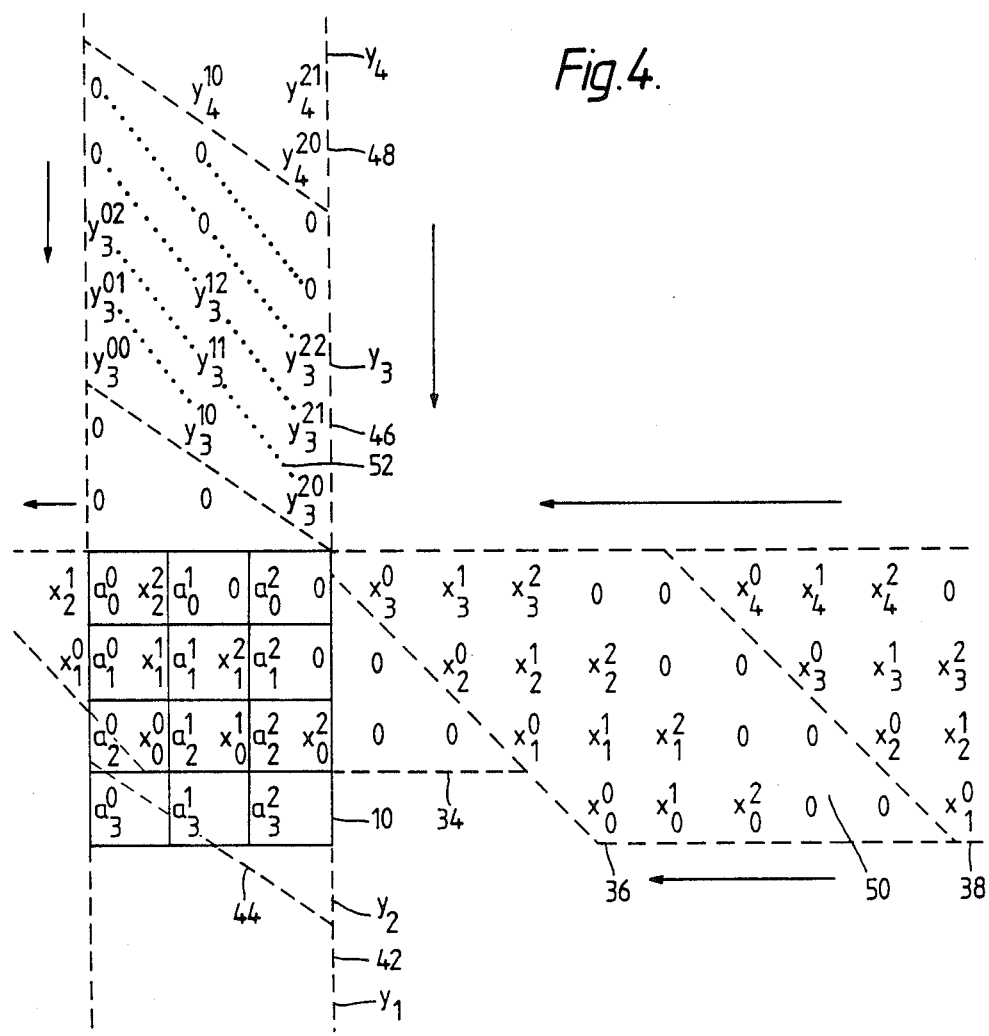
FIG. 4 illustrates bit level data propagation and partial sum formation in the FIG. 1 array.

Referring now also to FIG. 4, there is shown the bit-level equivalent of part of FIG. 3. The arrangement of individual data bits in parallelograms 34, 36 and 38 is shown. Each data bit moves through one cell 12 in one clock cycle when in the array 10. In each parallelogram, each three-bit data word is extended by two zero bits as indicated at 50 for example. This forms what is referred to in the art as a guard band to accommodate word or partial sum growth as will be described.

FIGS. 3 and 4 illustrate the fifteenth cycle of array operation, the first cycle being that on which the leading and least significant bit (lsb) $x_0^0$ of $X_0$ entered top right hand cell $12_{02}$ of the array 10. This may be verified by observing that $x_0^0$ is being multiplied by $a_2^0$ in cell $12_{20}$, having passed into its ninth cell via two delay units $22_0$ and $22_1$ (see FIG. 1) each giving three additional clock cycle delays. On each clock cycle, each bit of every data word moves one cell or position to the left and each result parallelogram moves one position downwards. In data parallelograms 36 and 38, data bit $x_3^0$ is about to enter top row cell $12_{02}$, but will not enter second row cell $12_{12}$ for another six cycles. Input of a word $X_{n-i}$ to any of the upper three rows accordingly leads input of that word to the respective row immediately below by six clock cycles, or by the word length plus one bit. Alternatively, and as illustrated in the parallelograms 30 to 38, successive words may be considered to be input to adjacent rows with a one bit time stagger which is cumulative down the array 10. Convolution computation will now be analysed in detail in terms of the production of $Y_3$ by data parallelogram 36 shown about to enter the array 10. On the clock cycle immediately following that illustrated, the lsb $x_3^0$ of $X_3$ will enter cell $12_{02}$ for multiplication by $a_0^2$. This produces $a_0^2 x_3^0$ only, since the y' or cumulative sum input to cell $12_{02}$ is zero, and so also is the input carry bit for this particular computation for reasons to be described later. On the second clock cycle after that illustrated, cell $12_{02}$ will recirculate a carry bit (zero in this particular case) for addition to the computation of $a_0^2 x_3^1$, and its neighbouring cell $12_{12}$ immediately below will receive a data input of $x_2^0$ for multiplication by $a_1^2$. It will also receive a y' input of $a_0^2 x_3^0$ from cell $12_{02}$ immediately above and a zero carry bit. Its cummulative sum output to cell $12_{22}$ below will accordingly be the lsb of $a_0^2 x_3^0 + a_1^2 x_2^0$, and it will recirculate the higher order bit of this two bit expression as a carry for addition to its subsequent computation. Similarly, on the next cycle, cell $12_{22}$ will produce a cumulative sum output of the lsb of $lsb(a_0^2 x_3^0 + a_1^2 x_2^0) + a_2^2 x_1^0$ and will recirculate as a carry bit the higher order bit of this expression. Four clock cycles after that illustrated, the cumulative sum output of cell $12_{32}$ at $24_{32}$ will be the partial sum $y_3^{20}$ given by:

$$y_3^{20} = 1sb(a_0^2 x_3^0 + a_1^2 x_2^0 + a_2^2 x_1^0 + a_3^2 x_0^0) = \qquad (2.1)$$

$$1sb \text{ of } \sum_{i=0}^{3} a_i^2 x_{n-i}^0$$

where the indices 20 of $y_3^{20}$ indicate multiplicand bit significance, not the partial sum significance. This is convenient for recognition of the appropriate grouping of partial sums to provide convolution results as will be described.

The carry bit c from this computation is given by:

c = higher order bit of
$lsb[lsb(a_0^2 x_3^0 + a_1^2 x_2^0) + a_2^2 x_1^0] + a_3^0 x_0^0$ (2.2)

In a similar manner, on the second, third, fourth and fifth cycles of operation following that illustrated, $x_3^1$ to $x_0^1$ will enter cells $12_{02}$ to $12_{32}$ respectively. Five clock cycles after that illustrated, the output of cell $12_{32}$ will be the partial sum $y_3^{21}$. This will include carry bits recirculated on the relevant cells following the first to fifth cycles, and is given by:

$$y_3^{21} = 1sb \text{ of } \left[ \sum_{i=0}^{3} a_i^2 x_{3-i}^1 + \text{carry bits from } \sum_{i=0}^{3} a_i^2 x_{3-i}^0 \right] \qquad (3)$$

On the sixth cycle after that illustrated, the output of cell $12_{32}$ will be:

$$y_3^{22} = 1sb \text{ of } \left[ \sum_{i=0}^{3} a_i^2 x_{3-i}^2 + \text{carry bits from } \sum_{i=0}^{3} a_i^2 x_{3-1}^1 \right] \qquad (4)$$

On the next two subsequent cycles of operation, the output of cell $12_{32}$ will be summations involving carry bits and zero input multiplicand bits by virtue of the guard band of zeros 50 in parallelogram 36. These summations accordingly involve four carry bits arising in the computation of $y_3^{22}$, which can only sum to a value two bits higher in significance than $y_3^{22}$. The guard bands of zeros such as 50 extending each data word accordingly provide for word growth in partial summations. When the upper edge of any result parallelogram such as 46 passes over any cell, the carry bit recirculated on that cell must become zero. This avoids carry bit propagation from one convolution result parallelogram to another, such as from 46 ($Y_3$) to 48 ($Y_4$). The use of guard bands has been described in the prior art and will not be discussed further. Just as terms of the kind $y_3^{2k}$ (k=0, 1 ...) emerge from the right hand column of the array 10 as described above, terms of the kind $y_3^{1k}$ and $y_3^{0k}$ emerge from the central and left hand columns respectively. By virtue of the one-bit time stagger between input of successive words to adjacent array rows, there is a one-bit time stagger between emergence of terms below adjacent array columns.

Eleven cycles after that illustrated in FIGS. 3 and 4, parallelogram 46 will have passed entirely out of or below the array 10. It will contain all the partial sums necessary to compute $Y_3$, since every bit of $X_3$ will have multiplied every bit of $A_0$ in the top array row, and so on down to $X_0$ and $A_3$ in the bottom row. However, the partial sums of the kind $y_3^{jk}$ must be accumulated appropriately to generate $Y_3$. Now $y_3^{jk}$ in each case is given by:

$$y_3^{jk} = 1sb \text{ of } \left[ \sum_{i=0}^{3} a_i^j x_{3-i}^k + \text{carry bits from } \sum_{i=0}^{3} a_i^j x_{3-i}^{k-1} \right] \qquad (5)$$

$y_3^{jk}$ accordingly has bit significance (j+k). In order to generate the $r^{th}$ bit $y_3^r$ of $Y_3$, where r=j+k, it is necessary to accumulate all terms of significance (j+k), including carries. In parallelogram 46 of FIG. 4, dotted lines link partial sums of like bit significance, such as line 52 linking $y_3^{20}$, $y_3^{11}$ and $y_3^{02}$. These partial sums are produced with a two clock cycle delay between adjacent sums; $y_3^r$ is given by:

$$y_3^r = y_3^{j+k} = 1sb \text{ of } \left[ \sum_{p=0}^{2} y^{p(r-p)} + \begin{array}{c} \text{carry bits from} \\ \text{accumulation of } y_3^{r-1} \end{array} \right] \qquad (6)$$

In parallelogram 46, it will be seen that $y_3^{02}$ is to be accumulated with two terms two and four clock cycles earlier, but $y_3^{01}$ and $y_3^{00}$ require accumulation with one and no earlier terms respectively. Accumulation must accordingly be performed adaptively to achieve this.

Figure 5:
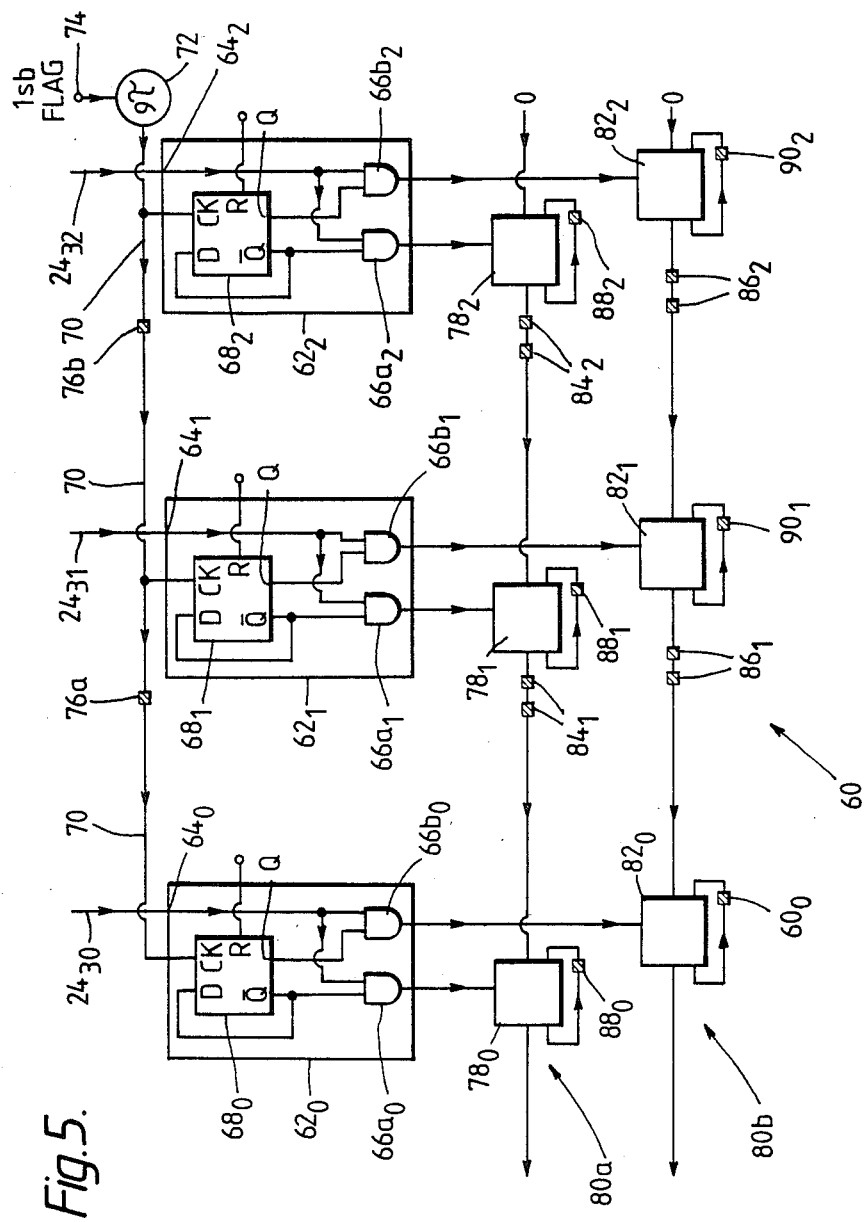
FIG. 5 is a block diagram of an accumulator device for accumulating partial sums generated by the FIG. 1 array.

Referring now to FIG. 5, there is shown an accumulator 60 appropriate for accumulating partial sums generated by the array 10. The accumulator 60 has three switching units $62_0$ to $62_2$ connected respectively to the bottom row cell outputs $24_{30}$ to $24_{32}$. Each unit $62_n$ (n=0 to 2) has a cumulative sum input $64_n$ connected as one input to each of two AND gates $66a_n$ and $66b_n$. Each unit $62_n$ also has a D-type flip-flop $68_n$ having a CK (clock) input connected to an lsb flag line 70. Each flip-flop $68_n$ has $\overline{Q}$ and Q outputs connected as inputs to AND gates $66a_n$ and $66b_n$ respectively, and each $\overline{Q}$ output is also connected to the corresponding D input. Each flip-flop has a reset input R which sets Q=0 and $\overline{Q}$=1 when pulsed. The lsb flag line 70 is connected to a delay unit 72 consisting of nine clocked latches in series (not shown) giving a nine clock cycle delay to an lsb flag input at 74. The line 70 contains two latches 76a and 76b, latch 76a being connected between the CK inputs of switching units $62_0$ and $62_1$ and latch 76b between the CK inputs of units $62_1$ and $62_2$.

The outputs from AND gates $66a_0$ to $66a_2$ are connected as inputs to respective full adders $78_0$ to $78_2$ forming a first accumulator chain indicated generally by 80a. Similarly, the outputs from AND gates $66b_0$ to $66b_2$ are connected to a second accumulator chain 80b of full adders $82_0$ to $82_2$. Each adder receives a second input, this input being zero in the case of adders $78_2$ and $82_2$, but being the output of its right hand neighbour delayed by two latches $84_n$ or $86_n$ (n=0 or 1) in the case of adders $78_0$, $78_1$, $82_0$ and $82_1$. Carry bits c are circulated on each adder via respective latches $88_n$ or $90_n$ (n=0, 1 or 2). All latches of FIG. 3 including those of delay unit 72 are clocked on every clock cycle by clocking means (not shown) in synchronism with latches of the array 10.

The accumulator 60 operates as follows. The reset inputs R of all three flip-flops $68_0$ to $68_2$ are initially pulsed to set each Q output to 0 and each $\overline{Q}$ output to 1. This starts accumulation in chain 80a, as will be described. In addition an lsb flag is employed to switch between accumulator chains 80a and 80b when the output from one column of the array 10 changes from one convolution result to the next; ie $Y_{n+1}$ is accumulated in a different chain to $Y_n$. The lsb $x_{n-i}^0$ of each data word $X_{n-i}$ is input to cell $12_{02}$ in synchronism with input of a respective lsb flag to delay unit 72, whose clocked latches give a nine clock cycle delay. When output from delay unit 72, each lsb clocks flip-flop $68_2$ immediately and flip-flops $68_1$ and $68_0$ one and two clock cycles later respectively by virtue of latches 76b and 76a in flag line 70. This transfers each D input to the respective Q output with the inverse appearing at $\overline{Q}$ and fed back to the D input. An lsb flag reaching a CK input accordingly causes both corresponding Q and $\overline{Q}$ outputs to change state. Now since any pair of AND gates $66a_n$ and $66b_n$ (n=0, 1 or 2) receives inputs from the Q and $\overline{Q}$ outputs of respective switching units $62_n$, at any time one will receive a zero input and the other a logic 1 input. The zero input produces a zero output irrespective of the other input to the AND gate from the array 10, whereas the logic 1 input provides for the relevant AND gate output to be 0 or 1 in accordance with the corresponding array output bit. Accordingly, the output from an array column is effectively fed to an accumulator chain 80a or 80b via an AND gate $66a_n$ or $66b_n$ addressed by a logic 1 input. Since the data words $X_{n-i}$ are five bits in length, a new lsb flag is output from delay unit 72 every five clock cycles. The state of each pair of Q and $\overline{Q}$ outputs therefore switches every five clock cycles to produce corresponding switching between accumulator chains.

Referring now also to FIG. 4 once more, $y_3^{20}$ will reach AND gates $66a_2$ and $66b_2$ via array output $24_{32}$ four clock cycles after that illustrated. At the same time, these AND gates receive the lsb flag input to delay unit 72 five cycles prior to that illustrated when $x_2^0$ was input to cell $12_{02}$. The lsb flag will switch from one accumulator chain to the other, ie from 80a to 80b. Partial sum $y_3^{20}$ accordingly reaches adder $82_2$, where it is added to a permanently zero cumulative sum input bit and to a carry input bit from latch $90_2$ which has become zero as will be described. Partial sum $y_3^{20}$ is then output to latches $86_2$ to experience a two clock cycle delay.

Five clock cycles after that illustrated, the lsb flag has switched the central column output $24_{31}$ to accumulator chain 80b. Adder $82_1$ receives $y_3^{10}$ and adds to it zero cumulative sum input and carry bits. These added bits are zero because neighbouring adder $82_2$ had zero inputs two cycles earlier and adder $82_1$ had zero inputs one cycle earlier, as will be clarified later. On this cycle also, $y_3^{20}$ becomes stored on the left hand latch of latch pair $86_2$, and $y_3^{21}$ is input to adder $82_2$ for addition to zero cumulative sum and carry input bits. Six clock cycles after that illustrated, the lsb flag switches left hand column output $24_{30}$ to accumulator chain 80b. Adder $82_0$ accordingly receives $y_3^{00}$ together with zero carry and cumulative sum input bits. It accordingly outputs $y_3^0$ (≡$y_3^{00}$), the lsb of $Y_3$. A zero carry bit is recirculated. On this cycle, adder $82_1$ receives $y_3^{11}$ from switching unit $62_1$ and $y_3^{20}$ from adder $82_2$. It outputs the lsb of $y_3^{11}+y_3^{20}$ to latches $86_1$ and recirculates the corresponding higher significance bit as a carry. In addition, adder $82_2$ outputs $y_3^{22}$ to latches $86_2$.

On the seventh clock cycle after that illustrated, adder $82_0$ receives $y_3^{01}$ from above and $y_3^{10}$ from its right, and adds to them a zero carry from the preceding $y_3^{00}$ computation to produce output of $y_3^1$, the second lsb of $Y_3$. Simultaneously, adder $82_2$ receives and outputs a carry bit computed by the array 10 in the $y_3^{22}$ summation and one level higher in bit significance. Adder $82_1$ receives $y_3^{20}$ from its right and $y_3^{11}$ from above, and adds them to the zero carry bit from its $y_3^{10}$ summation.

On the eighth clock cycle after that illustrated, adder $82_0$ receives $y_3^{02}$ from above and the lsb of $(y_3^{11}+y_3^{20})$ from its right. It adds to these the carry bit from its preceding $y_3^1$ computation to produce $y_3^2$, the third lsb of $Y_3$.

Extending the foregoing analysis it will be apparent that $y_3^q$, the bit of significance q of $Y_3$ is output from adder $82_0$ (q+6) cycles after that illustrated in FIG. 4. This analysis is easily generalised to show that the $q^{th}$ bit $y_n^q$ of $Y_n$ emerges from adder $82_0$ (n odd) (5n+q+6) cycles after that shown. Moreover, each $Y_n$ is the sum of a maximum of four products of two three-bit words. The maximum possible value obtainable is accordingly 4×7×7 or 196, this being eight bits in length; $y_3^8$ and all higher order bits of $Y_3$ must therefore be zero. Adder $82_0$ accordingly receives a zero carry input on the fourteenth cycle after that illustrated, the equivalent for adders $82_1$ and $82_2$ occurring two or more cycles earlier.

On the ninth, tenth and eleventh clock cycles after that illustrated, a further lsb flag clocks the CK inputs of D type flip-flops $68_2$, $68_1$ and $68_0$. This switches accumulation of $Y_4$ to accumulator chain $80a$ comprising adders $78_0$ to $78_2$. Adders $82_2$ to $82_0$ will therefore not receive further partial sum inputs until the fourteenth, fifteenth and sixteenth subsequent cycles respectively, when a further lsb flag effects switching in each case and $Y_5$ begins accumulation. In effect, switching between accumulator chains every five clock cycles allows accumulation of ten bit $Y_n$ convolution results only eight bits of which are needed in this example. Accordingly, $Y_3$ accumulation cannot extend into that of $Y_5$ in the same chain $80b$, and this also applies to any pair of results $Y_n$ and $Y_{n+2}$ in either chain. A similar analysis to that above shows that for n even, $y_n{}^q$ of $Y_n$ emerges from adder $78_0$ $(5n+q+6)$ clock cycles after that shown.

The array 10 is arranged for data input at cell $12_{02}$, so that the lsb $x_{n-i}{}^0$ of each data word $X_{n-i}$ meets a most significant coefficient bit $a_0{}^2$ of $A_0$ first. If the order of the coefficient bits is reversed so that each $x_{n-i}{}^0$ meets $a_0{}^0$ first, the effect on partial sum generation is that partial sums of like bit significance are generated on the same clock cycle, instead of with an intervening two clock cycle delay between adjacent sums. A different form of accumulator is then required. A pair of adder trees is employed instead of two accumulator chains, and switching between trees is provided for in a similar manner to that previously described. The principles of adder trees are very well known in digital electronics and this will not be described in detail.

Referring to FIG. 5 once more, delay unit 72 may be arranged to provide a shorter delay, or even dispensed with. It does not matter if there is some unnecessary initial switching between accumulator chains so long as there is a change every five cycles, ie at a switching frequency equal to the clock period divided by the data word bit-length. The delay unit 72 may accordingly give a four clock cycle delay, or be dispensed with if the flag is input one cycle earlier than data lsb input.

The example of the invention described with reference to FIGS. 1 to 5 employed three bit data and coefficient words. More generally, for an N-point convolution involving p-bit data words and q-bit coefficient words, each data word is extended by $\log_2 N$ zeros and the equivalent of delay devices $22_0$ to $22_2$ provide for $(1+\log_2 N+p-q)$ clock cycle delays.

The invention provides the advantage of being cascadable. As described, the cumulative sum inputs to array cells $12_{00}$ to $12_{02}$ were set to zero. These might however be connected to receive the output from an equivalent array 10, which would provide an eight point convolution. In this way, large convolution arrays can be built up from a number of small sub-arrays connected in series together with a single accumulator device equivalent to 60. However, guard bands would require further extension to accommodate larger partial sums, and it is preferable to accumulate stage by stage as will be described later.

Figure 6:
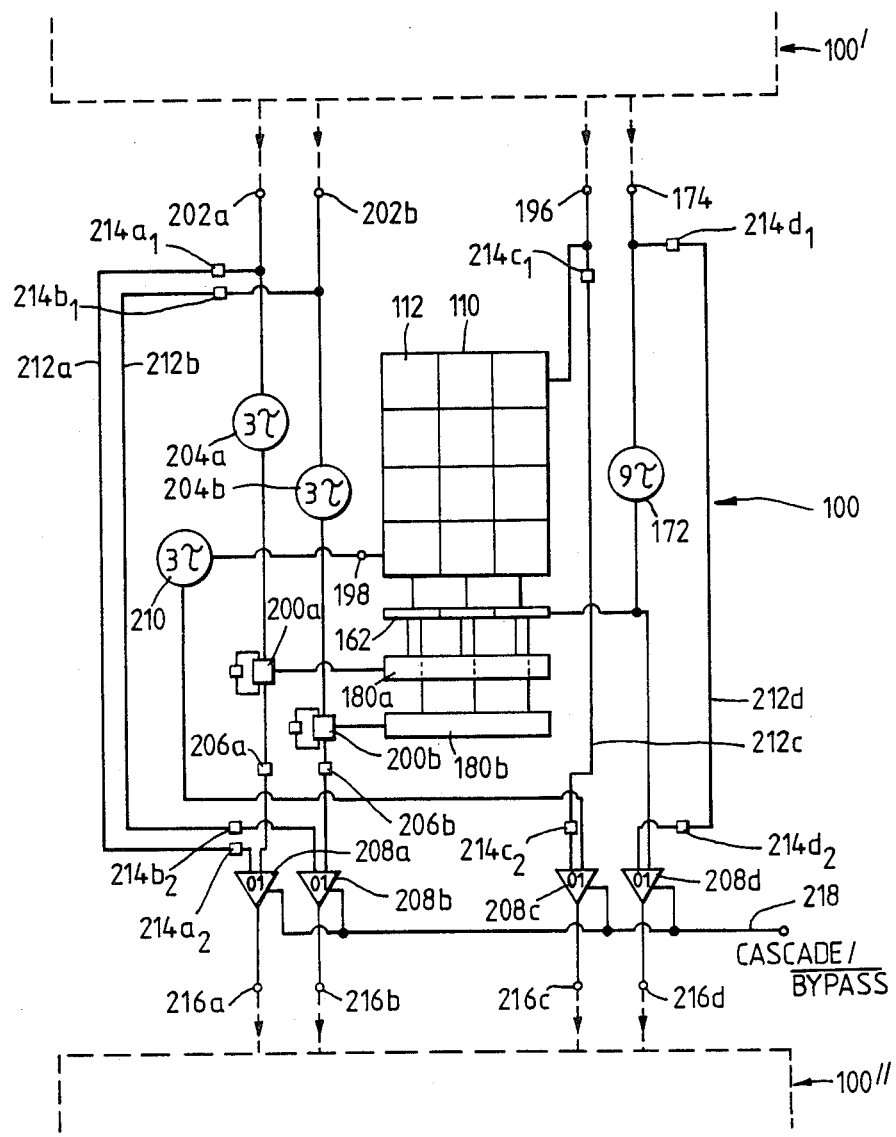
FIG. 6 is a schematic drawing of a cascaded fault tolerant processor arrangement.

Referring now to FIG. 6, in which parts equivalent to those previously described are like-referenced with the prefix 100, there is shown a processor 100 of the invention arranged for cascading to provide a fault tolerant array. The processor 100 includes an array 110 of clock-activated gated full adder logic cells indicated schematically by rectangles such as 112. The array 110 is connected via a bank of switches 162 to two accumulator chains $180a$ and $180b$. The switches 162 are connected via a delay unit 172 to an lsb flag input 174, the delay unit 172 giving a delay of nine clock cycles. The processor has a data input 196 and a data output 198.

The accumulator chains $180a$ and $180b$ are connected as first inputs to respective full adders $200a$ and $200b$ each arranged for carry recirculation. The processor 100 has two convolution result inputs $202a$ and $202b$ connected via clock-activated delay units $204a$ and $204b$ to provide second inputs to the adders $200a$ and $200b$. Output sums from the adders $200a$ and $200b$ pass via clock-activated latches $206a$ and $206b$ to the 1-selected inputs of respective one-bit multiplexers $208a$ and $208b$. Two further one-bit multiplexers $208c$ and $208d$ have 1-selected inputs connected respectively to receive data output from the array 110 after a three clock cycle delay at a clock-activated unit 210 and the lsb flag signal from delay unit 172. Each of the multiplexers $208a$ to $208d$ has a 0-selected input connected to a respective processor bypass line $212a$ to $212d$. The bypass lines $212a$ to $212d$ are connected to the convolution result inputs $202a$ and $202b$, the data input 196 and the lsb flag input 174 respectively. Each bypass line contains two respective clock-activated latches $214a_1$ and $214a_2$ to $214d_1$ and $214d_2$ arranged near a corresponding input or output in each case. The multiplexers $208a$ to $208d$ have respective outputs $216a$ to $216d$, these receiving signals from respective 0 or 1-selected inputs in accordance with the signal on a CASCADE/BYPASS line 218.

The processor 100 is designed to be suitable to provide elements of a cascaded chain of like processors. This enables convolutions involving a large coefficient set to be carried out by processors each individually designed for a small coefficient set. As illustrated, the processor 100 is connected between equivalent processors 100' and 100" indicated in part by chain lines. Data, lsb flags and convolution results output by processor 100' pass to corresponding data, lsb flag and convolution result inputs of processor 100. Similarly, multiplexers $208a$ to $208d$ provide convolution results, data and lsb flags to processor 100".

The FIG. 6 arrangement operates as follows. The array 110, bank of switches 162 and accumulator chains operate as previously described with reference to FIGS. 1 to 5. They accordingly produce even-numbered convolution results from accumulator chain $180a$ and odd numbered convolution results from accumulator chain $180b$. As has been said, each result is a number of not more than eight bits, but ten bits are available in each accumulator chain to accommodate non-overlapping results. Each convolution result may therefore be added to up to three other radicals from other processors without exceeding ten bits.

The multiplexers $208a$ to $208d$ provide for the processor 100 to be implemented in a cascaded array or bypassed in accordance with whether or not it is fault-free. Initially it is taken to be fully operational; CASCADE/BYPASS line 218 is set to logic 1 as are corresponding lines in processors 100' and 100". Convolution results, data and lsb flags from processor 100' pass to inputs $202a$, $202b$, 196 and 174 for use in processor 100. Adders $200a$ and $200b$ add the convolution results obtained in the processors 100' and 100, and the sums pass to multiplexers $208a$ and $208b$ via latches $206a$ and $206b$. In combination, delay units $204a$ and $204b$ together with latches $206a$ and $206b$ produce a four clock cycle delay for convolution results per processor stage. This is required to synchronise arrival of bits of the same significance at adders $200a$ and $200b$, since an array such as 110 takes four clock cycles to generate a contribution to a convolution result. In general, a delay unit 204a or 204b will provide (n−1) clock cycle delays for an n-row array. Alternatively, a latch such as 206a might be incorporated in a delay unit such as 204a, in which case this delay unit would provide a delay equal to the number of array rows. As a further alternative, the delay unit 210 might be relocated between the array 110 and the array data input 196 producing an equivalent effect.

The processors 100', 100 and 100" may be considered to be carrying out the convolution of a set of twelve coefficients $A_0$ to $A_{11}$ with data words $X_{n-i}$. Each operates with a respective coefficient subset, ie processor 100' with $A_0$ to $A_3$, processor 100 with $A_4$ to $A_7$ and processor 100" with $A_8$ to $A_{11}$. In consequence, the outputs from accumulator chains 180a and 180b and the equivalent in the other processors will be:

$$\text{Processor 100': } \sum_{i=0}^{3} A_i X_{n-i} \quad (7.1)$$

$$\text{Processor 100: } \sum_{i=4}^{7} A_i X_{n-i} \quad (7.2)$$

$$\text{Processor 100": } \sum_{i=8}^{11} A_i X_{n-i} \quad (7.3)$$

By inspection, expressions (7.1) to (7.3) can simply be added to provide a twelve point convolution result over indices i=0 to 11. Accumulation processor by processor in this way in a cascaded array avoids the need for excessively large guard bands which would otherwise be required in a large single processor or in cascaded arrays of logic cells such as arrays 110 with a single accumulator.

To verify that the FIG. 6 arrangement produces the correct timing of data flow and result accumulation, it is merely necessary to carry out an analysis similar to that described with reference to FIGS. 1 to 5. This is straightforward and will not be described. It is simply observed that a twelve row array would produce an output partial sum after twelve clock cycles. Accordingly, partitioning this into three four row arrays as in FIG. 6 requires outputs of the first four rows to experience a four clock cycle delay to synchronise with outputs from the second four rows, and both to undergo a further like delay to synchronise with outputs from the third four rows.

Turning now to the situation in which processor 100 is found to be faulty, in this case CASCADE/BYPASS line 218 receives a 0 input. Outputs 216a to 216d consequently become connected to bypass lines 212a to 212d via the 0-selected inputs of multiplexers 208a to 208d. Input lsb flags, data and convolution results accordingly become routed from inputs 174, 196, 202a and 202b to multiplexer outputs bypassing the faulty processor 100. By virtue of latches $214a_1$ and $214a_2$ to $214d_1$ and $214d_2$, each input experiences a two clock cycle delay.

The net effect of setting CASCADE/$\overline{\text{BYPASS}}$ line 218 to 0 is therefore to replace processor 100 by a two clock cycle delay for all inputs. Since data, results and lsb flags are delayed equally, this does not disrupt the relative timing of input signals to processor 100".

The bypass arrangements in FIG. 6 allow the processor 100 to be part of a fault-tolerant chain of cascaded processors. Such a chain includes more processor stages (each equivalent to processor 100) than are required to carry out a given convolution. Processor stages that are faulty or unnecessary are then bypassed as previously described. This leads to an important advantage of the FIG. 6 arrangement. Bypass connections normally require comparatively long conductors to take the signal from a first integrated circuit around a second to a third. The RC time constant of such a conductor is undesirably long, and the rate at which any pipelined circuit can be clocked is limited by the slowest element in the pipeline. Consequently, long conductors reduce maximum clock rate. However, by introducing bypass latches such as $214a_1$ and $214a_2$, the bypass conductors are subdivided into lengths which can be switched as fast as other circuit elements such as logic cells. Accordingly, the rate of data throughput and result generation is not reduced as a result of bypassing. Circuit latency is of course increased by two clock cycles, this being the time taken for any given result to accumulate. Latency is unimportant however, since maintaining a clocking rate of say 20 MHz is much more important than waiting an additional two cycles or 0.1 microsecond. In digital signal processing circuits, the rate of data processing considerably outweighs latency considerations.

The number of latches in any bypass line depends on the RC time constant per unit length. Whereas two latches per bypass line are illustrated in FIG. 6, in any integrated circuit design this number will be varied as appropriate to individual design constraints.

The foregoing latched bypass arrangements preserving operating speed cannot be employed in for example the processor of Reference 1, in which data progresses through an array in the opposite direction to result generation. To illustrate this, consider a cascaded array of prior art processors in which one processor is faulty. Using latched bypass connections, results moving around a bypassed processor would undergo a delay before reaching the next stage, whereas data moving to that stage from a different processor would not have undergone a delay.

Consequently, result generation would become delayed with respect to data flow, and results produced would become meaningless as partial products became added to inappropriate partial sums. Latches cannot therefore be employed in bypassing prior art processors. Cascaded arrays of such processors would therefore need to operate very slowly as compared to the invention if required to be fault tolerant.

Whereas the processor 100 has two accumulator chains 180a and 180b to allow cascading and computation of ten bit convolution results, one or more additional chains may be furnished to allow for larger results to be computed. One additional chain would for example allow cascading of up to $2^7$ processors, which is far more than would normally be required. Such a third chain would be associated with a respective bypass line, full adder and multiplexer. Switching between three or more accumulator chains in succession requires straightforward logic circuitry well known in the art.

The examples of the invention have related to processors appropriate for positive data and positive coefficients. These can be modified to deal with positive and negative data and coefficients by the use of a control bit cell input and accumulator correction similar to that described in detail in Reference 1.

Whereas the examples of the invention have been described in terms of convolution. They are also suitable for use in correlation. This is described in Reference 1. Repeating Equation (1) for ease of reference, the convolution operation is defined by:

$$Y_n = \sum_{i=0}^{N-1} A_i X_{n-i} \text{ provided } i \leq n \quad (1)$$

The correlation operation is defined by:

$$Y_n = \sum_{i=0}^{N-1} A_i X_{n+i} \quad (8)$$

From Equation (1) the fifth convolution result $Y_4$ of four point computations (N=4) is given by:

$$Y_4(\text{convolution}) = A_0 X_4 + A_1 X_3 + A_2 Y_2 + A_3 X_1 \quad (9)$$

From Equation (8), the second correlation result $Y_1$ of a four point computation is given by:

$$Y_1(\text{correlation}) = A_0 X_1 + A_1 X_2 + A_2 X_3 + A_3 X_4 \quad (10)$$

Rearranging Equation (10) with the right hand side in reverse order and writing $B_i = A_{3-i}$, i=0 to 3:

$$Y_1(\text{correlation}) = B_0 X_4 + B_1 X_3 + B_2 X_2 + B_3 X_1 \quad (11)$$

Equations (9) and (11) are equivalent, demonstrating that convolution and correlation are equivalent mathematical operations. Convolution of data with a set of coefficients is equivalent to correlation of the same data with the same coefficients in reverse order. For a given set of coefficients $A_o$ to $A_k$, a convolution or correlation operation will be performed by a processor of the invention according to whether coefficient words are array such as array 10 beginning with $A_o$ to the top or bottom row. There is a small difference in that the first few terms in a convolution result series are absent in the corresponding correlation series. Equation (8) for example cannot generate $Y_0$ to $Y_2$ of Equation (1). However, for practical purposes this is not important. Digital arithmetic circuits are employed to generate very large numbers of results, and a few extra or absent results at the beginning of a series of millions for example is insignificant.

We claim:

1. A digital processor suitable for performing an N point convolution or correlation computation of coefficient words of q bits with data words guard band extended to p bits, where N, q and p are positive integers greater than unity, and wherein:
   (1) the processor includes an array of N rows and q columns of one-bit logic cells;
   (2) each logic cell is arranged to:
      (a) input a data bit, a carry bit and a cumulative sum bit,
      (b) output said data bit,
      (c) produce an output cumulative sum bit and an output carry corresponding to addition of the input cumulative sum bit and the input carry bit to a product of the input data bit with a respective stationary coefficient bit, and
      (d) recirculate the output carry bit on the respective cell to provide an input carry bit for a succeeding computation;
   (3) cell interconnection lines are arranged to provide for propagation of data bits along array rows and for accumulation of cumulative sum bits in cascade down array columns;
   (4) the cell interconnection lines include clock-activated first delaying means arranged to effect data bit movement along array rows at the same rate as cumulative sum bit movement down array columns;
   (5) the array has a first row, first column cell for data word input to the array serially, least significant bit leading;
   (6) each last column cell in the first to (N−1)th rows has a respective data bit output connected via a respective second clock-activated delaying means to a data bit input of a respective first column cell in a respective adjacent row from the second to Nth rows to provide for data to move along successive rows down the array, the first and second delaying means being arranged in combination to delay successive data bits as appropriate for accumulation of cumulative sum bits in cascade down each array column; and
   (7) the processor includes accumulating means arranged to add cumulative sum bits of the like bit significance output from different array columns and comprising contributions to like computation term bits.

2. A digital processor according to claim 1 including an additional clock-activated delay unit connected in series with a first row, first column cell data input, the delay unit being arranged for relaying data to another like processor.

3. A digital processor according to claim 1 including an accumulator device arranged to add array output cumulative sum bits of like bit significance and to accumulate successive convolution or correlation results in different adding means.

4. A digital processor according to claim 3 wherein each adding means is arranged to sum convolution or correlation computations produced by the processor with other like results input to it, as appropriate to provide for processors to be cascaded with stage by stage accumulation.

5. A digital processor in accordance with claim 3 wherein the accumulator device is arranged to switch between adding means in response to an input flag bit indicating arrival of a bit of appropriate significance.

6. A digital processor according to claim 1 including bypass lines arranged to reroute inputs to the processor around it, the bypass lines being implemented in the event of a processor fault as appropriate to isolate a faulty processor in a cascaded processor chain.

7. A digital processor according to claim 6 wherein the bypass lines comprise line sections connected together via clock-activated delaying means.

8. A digital processor according to claim 1 including an additional clock-activated delay unit connected in series with a last row, last column cell data output, the delay unit being arranged for relaying data to another like processor.

* * * * *